US012583749B2

(12) United States Patent　　　(10) Patent No.:　US 12,583,749 B2
Cao et al.　　　　　　　　　　　　(45) Date of Patent:　　Mar. 24, 2026

(54) TITANIUM-ZIRCONIUM CO-DOPED CARBON-COATED LITHIUM IRON PHOSPHATE MATERIAL AND PRODUCTION METHOD AND USE THEREOF

(71) Applicant: HUBEI WANRUN NEW ENERGY TECHNOLOGY CO., LTD., Shiyan (CN)

(72) Inventors: Minglei Cao, Shiyan (CN); Qin Wang, Shiyan (CN); Jiaojiao Yang, Shiyan (CN)

(73) Assignee: HUBEI WANRUN NEW ENERGY TECHNOLOGY CO., LTD., Shiyan (CN)

( * ) Notice: Subject to any disclaimer, the term of this patent is extended or adjusted under 35 U.S.C. 154(b) by 545 days.

(21) Appl. No.: 18/037,811

(22) PCT Filed: Nov. 11, 2022

(86) PCT No.: PCT/CN2022/131291
§ 371 (c)(1),
(2) Date: May 19, 2023

(87) PCT Pub. No.: WO2023/124574
PCT Pub. Date: Jul. 6, 2023

(65) Prior Publication Data
US 2024/0166517 A1　　May 23, 2024

(30) Foreign Application Priority Data

Dec. 29, 2021　(CN) ......................... 202111629862.7

(51) Int. Cl.
| *H01M 4/485* | (2010.01) |
| *C01B 25/45* | (2006.01) |
| *H01M 4/505* | (2010.01) |
| *H01M 10/0525* | (2010.01) |

(52) U.S. Cl.
CPC ......... *C01B 25/45* (2013.01); *H01M 10/0525* (2013.01); *C01P 2002/72* (2013.01); *C01P 2004/03* (2013.01); *C01P 2006/40* (2013.01)

(58) Field of Classification Search
CPC ..... C01B 25/45; H01M 10/0525; H01M 4/08; H01M 4/13; H01M 4/131; H01M 4/139; H01M 4/36; H01M 4/382; H01M 4/405; H01M 4/485; H01M 4/505; C01P 2002/72; C01P 2004/03; C01P 2006/40
See application file for complete search history.

(56) References Cited

U.S. PATENT DOCUMENTS

| 2009/0220858 A1 | 9/2009 | Cheng et al. |
| 2015/0232338 A1 | 8/2015 | Chou et al. |
| 2019/0386306 A1 | 12/2019 | Chou et al. |

FOREIGN PATENT DOCUMENTS

| CN | 101200289 A | 6/2008 |
| CN | 102009970 A | 4/2011 |
| CN | 102044667 A | 5/2011 |
| CN | 102468489 A | 5/2012 |
| CN | 103078113 A | 5/2013 |
| CN | 106784828 A | 5/2017 |
| CN | 107611413 A | 1/2018 |
| CN | 108011104 A | 5/2018 |
| CN | 108682833 A | 10/2018 |
| CN | 109192953 A | 1/2019 |
| CN | 112978704 A | 6/2021 |
| CN | 114314548 A | 4/2022 |
| JP | 2010-86658 A | 4/2010 |
| JP | 2012012262 A | 1/2012 |
| JP | 2013-1605 A | 1/2013 |
| JP | 2014-55085 A | 3/2014 |

OTHER PUBLICATIONS

Electronically conductive phospho-olivines as lithium storage electrodes, Chung et al, nature materials | vol. 1 | Oct. 2002.*
Adjusting Oxygen Redox Reaction and Structural Stability of Li- and Mn-Rich Cathodes by Zr—Ti Dual-Doping, Feng et al., ACS Appl. Mater. Interfaces 2022, 14, 5308-5317.*
A study on LiFePO4 and its doped derivatives as cathode materials for lithium-ion batteries, Wang et al. Journal of Power Sources 159 (2006) 282-286.*
Enhanced rate performance of LifePO4/C by co-doping titanium and vanadium, Long et al., Solid State Sciences 48 (2015) 104-111.*
International Search Report for PCT/CN2022/131291 mailed Feb. 8, 2023, ISA/CN.
Libin Gao, et al., The co-doping effects of Zr and Co on structure and electrochemical properties of LiFePO4 cathode materials, Journal of Alloys and Compounds, 739 (2018) 529.
Hui Fang, et al., Electrochemical Properties of Cathode Material LiFePO4 with Ti Substitution, Journal of The Electrochemical Society, 160 (2013) A3148-A3152.
Yuanchao Li, et al., Synthesis of LiFePO4 Nanocomposite with Surface Conductive Phase by Zr Doping with Li Excess for Fast Discharging, Journal of The Electrochemical Society, 166 (2019) A410-A415.

(Continued)

*Primary Examiner* — Haidung D Nguyen
(74) *Attorney, Agent, or Firm* — The Sun IP Law

(57) ABSTRACT

Provided is a titanium-zirconium co-doped carbon-coated lithium iron phosphate material and a production method and use thereof. The material has a chemical formula of $Li_{1-y}Zr_yFe_{1-x}Ti_xPO_4/C$, wherein titanium is doped to Fe site, zirconium is doped to Li site, $0.001 \leq x \leq 0.05$, and $0.001 \leq y \leq 0.02$. The production method comprises mixing iron phosphate, lithium carbonate, a carbon source, a titanium source and a zirconium source in a liquid medium, ball-milling and sand-milling the mixture to a certain slurry particle size, spray-drying the slurry for granulation, and then sintering the dried spray material in an atmosphere furnace. In the present disclosure, by doping titanium and zirconium elements into carbon-coated lithium iron phosphate, the ion and electron transport capacity of lithium iron phosphate is effectively enhanced and the compaction density of the material is improved. The material is very suitable to be used as a positive electrode material for a lithium-ion power battery.

10 Claims, 2 Drawing Sheets

(56)                    References Cited

OTHER PUBLICATIONS

Shehuang Wu, et al.,Preparation and characterization of Ti4+-doped LiFePO4 cathode materials for lithium-ion batteries, Journal of Power Sources, 189 (2009) 440-444.
Extended European Search Report mailed Jun. 24, 2024 in European Application No. 22891174.9, 9 pages.
Notice of Reasons for Refusal mailed Jul. 1, 2024 in Japanese Application No. 2023-529058, with English machine translation, 12 pages.
Korean Office Action mailed Apr. 1, 2025 in Korean Application No. 10-2023-7020861, with English translation, 10 pages.
First Office Action mailed Jun. 24, 2022 in Chinese Application No. 202111629862.7, with English translation, 16 pages.
Second Office Action mailed Aug. 3, 2022 in Chinese Application No. 202111629862.7, with English translation, 15 pages.
Hu, "The Preparation and Modification Research of Lithium Ion Battery Cathode Material LiFePO$_4$," University of Electronic Science and Technology of China, with English abstract (pp. II-III), Jun. 2014, 66 pages.
Office Action mailed Oct. 6, 2025 in European Application No. 22 891 174.9, 3 pages.

* cited by examiner

TITANIUM-ZIRCONIUM CO-DOPED CARBON-COATED LITHIUM IRON PHOSPHATE MATERIAL AND PRODUCTION METHOD AND USE THEREOF

CROSS REFERENCE TO RELATED APPLICATIONS

This application is the national phase of International Application No. PCT/CN2022/131291, titled "TITANIUM-ZIRCONIUM CO-DOPED CARBON-COATED LITHIUM IRON PHOSPHATE MATERIAL AND ITS PREPARATION METHOD AND APPLICATION", filed on Nov. 11, 2022, which claims the priority to Chinese Patent Application No. 202111629862.7, titled "TITANIUM-ZIRCONIUM CO-DOPED CARBON-COATED LITHIUM IRON PHOSPHATE MATERIAL AND ITS PREPARATION METHOD AND APPLICATION", filed on Dec. 29, 2021, with the China National Intellectual Property Administration, which are incorporated herein by reference in entirety.

FIELD

The present disclosure belongs to the technical field of new energy materials and production thereof, and in particular relates to a titanium-zirconium co-doped carbon-coated lithium iron phosphate material and a production method thereof. The material can be used as a high-performance positive electrode material in lithium-ion power batteries

BACKGROUND

In 1997, J. Goodenough et al. reported that lithium iron phosphate ($LiFePO_4$) could be used as positive electrode material for lithium-ion batteries. This research caused a great sensation in the academic circle and started the industrialization of $LiFePO_4$. Since $LiFePO_4$ has the advantages of long cycle life, high safety and low cost, it has rapidly developed into an important positive electrode material for lithium-ion batteries. Lithium-ion batteries using $LiFePO_4$ as the positive electrode material have been widely used in fields including portable electronic devices, automobiles, ships and energy storage. In recent years, with the rapid development of new energy vehicle industry in China, the demand for lithium-ion power batteries has continued to increase. The installed capacity of power batteries using $LiFePO_4$ as the positive electrode material has gradually increased, which leads to a rapid growth momentum in the $LiFePO_4$ positive electrode material market.

However, compared with other positive electrode materials, especially ternary positive electrode materials, $LiFePO_4$ has low specific capacity and compaction density, and low ionic and electronic conductivity leads to poor high-current charge and discharge capabilities of the material. These defects seriously limit the improvement of the energy density and power density of $LiFePO_4$. In order to improve the electrochemical performance and compaction density of $LiFePO_4$, researchers generally use techniques such as morphology and size control, carbon coating and ion doping to overcome the inherent defects of the material. Metal ion doping is an important method to improve the electrochemical performance of $LiFePO_4$. For example, doping titanium ions on Fe site of the material can effectively enhance the capability of transporting lithium ions and electrons of the material [J. Power Sources, 189 (2009) 440;

J. Electrochem. Soc., 160 (2013) A3148; CN108598383A; CN111498825A]. However, the effect of titanium ion doping on the improvement of the compaction density of $LiFePO_4$ material is not very significant. In recent years, related studies have shown that zirconium ions can be doped into Li sites of $LiFePO_4$ material [J. Alloys Compd., 739 (2018) 529; J. Electrochem. Soc., 166 (2019) A410; CN108682833B]. This doping can not only adjust the particle size and morphology of $LiFePO_4$ material, but also optimize the carbon-coating effect, forming a closer interaction between carbon material and $LiFePO_4$. Therefore, zirconium ion doping can achieve the purpose of improving the compaction density of $LiFePO_4$ material.

In summary, if the synergistic doping of $LiFePO_4$ material with titanium ions and zirconium ions can be realized, it is possible to overcome the inherent defects of the material, effectively improve the intrinsic conductivity and compaction density, and realize significant improvement of the energy density and power density.

Therefore, it is a technical problem to be solved to develop a titanium-zirconium co-doped carbon-coated lithium iron phosphate material.

SUMMARY

The present disclosure aims at the defects and improvement needs of the above prior art, and provides a titanium-zirconium co-doped carbon-coated lithium iron phosphate material having high energy density and high power density and a production method and use thereof, wherein the material is obtained by doping metal titanium ions and zirconium ions respectively into Fe sites and Li sites of $LiFePO_4$ material, and the synergistic doping of titanium ions and zirconium ions can effectively improve the electrochemical performance and compaction density of $LiFePO_4$ material.

The present disclosure is realized by the following technical solutions:

The above titanium-zirconium co-doped carbon-coated lithium iron phosphate material has a chemical formula of $Li_{1-y}Zr_yFe_{1-x}Ti_xPO_4/C$, wherein titanium is doped to Fe site, zirconium is doped to Li site, $0.001 \leq x \leq 0.05$, and $0.001 \leq y \leq 0.02$, and the material has a carbon content of 0.5-5.0 wt %.

A method for producing the titanium-zirconium co-doped carbon-coated lithium iron phosphate material comprises mixing iron phosphate, lithium carbonate, a carbon source, a titanium source and a zirconium source in a liquid medium, ball-milling and sand-milling the mixture to a certain slurry particle size, spray-drying the slurry for granulation, then sintering the dried spray material in an atmosphere furnace, and pulverizing the resulting material to finally obtain the titanium-zirconium co-doped carbon-coated lithium iron phosphate material.

The method for producing the titanium-zirconium co-doped carbon-coated lithium iron phosphate material comprises the steps of:

(1) weighing iron phosphate, lithium carbonate, a titanium source and a zirconium source according to an element molar ratio of Li:Zr:Fe:Ti:P of 1-y:y:1-x:x:1, and mixing them in a liquid medium, where $0.001 \leq x \leq 0.05$, $0.001 \leq y \leq 0.02$;

(2) adding a carbon source to the mixture obtained in step (1), and then ball-milling and sand-milling the mixture to control a slurry particle size at 0.1-0.8 μm;

(3) spray-drying the slurry obtained in step (2) at an atomization frequency of 20-80 Hz, with a heating air at an air inlet temperature of 100-300° C., and an air outlet temperature of 50-200° C.;

(4) pre-sintering the dried spray material obtained in step (3) in an atmosphere furnace with protective gas at 300-500° C. for 2-5 h, and then sintering it at 500-900° C. for 5-15 h to obtain the titanium-zirconium co-doped carbon-coated lithium iron phosphate material.

In the method for producing the titanium-zirconium co-doped carbon-coated lithium iron phosphate material, the titanium source is selected from the group consisting of titanium dioxide, titanyl sulfate, titanium tetrachloride, tetrabutyl titanate and a mixture thereof; the zirconium source is selected from the group consisting of zirconium oxide, zirconium hydroxide, zirconium nitrate, zirconium phosphate and a mixture thereof; the liquid medium is selected from the group consisting of deionized water, anhydrous ethanol and a mixture thereof; the carbon source is selected from the group consisting of glucose, sucrose, citric acid, polyethylene glycol and a mixture thereof, and the carbon source is added at such an amount that the carbon content in the final product is 0.5-5.0 wt %; the spay-drying is conducted at an atomization frequency of 60 Hz, an air inlet temperature of 200° C., and an air outlet temperature of 100° C.; the pre-sintering is conducted at 400° C. for 3 h; and the sintering is conducted at 800° C. for 10 h.

As to use of the titanium-zirconium co-doped carbon-coated lithium iron phosphate material, the material is used as a positive electrode material in a lithium-ion battery, wherein the material is the titanium-zirconium co-doped carbon-coated lithium iron phosphate material according to claim 1 or the titanium-zirconium co-doped carbon-coated lithium iron phosphate material produced by the method according to any one of claims 1-9.

Beneficial effects are as follows:

The titanium-zirconium co-doped carbon-coated lithium iron phosphate material and the production method thereof according to the present disclosure make use of cheap and widely available raw materials and simple process, and can realize industrialized batch production. The titanium source and zirconium source can be added to the reaction system simultaneously, to realize doping of Fe site of the $LiFePO_4$ material with titanium ions and doping of Li site with zirconium ions. The doping of titanium ion can improve the intrinsic conductivity of $LiFePO_4$ material, and the doping of zirconium ion can increase the compaction density by adjusting the morphology and size, and optimizing carbon-coating effect.

The co-doping of titanium ions and zirconium ions can produce a synergistic effect. For one thing, it can enhance the capability of transporting lithium ions and electrons of the $LiFePO_4$ material, and for another thing, it can effectively improve the compaction density of the material. The obtained titanium-zirconium co-doped carbon-coated lithium iron phosphate material has a discharge capacity of greater than 158.0 mAh $g^{-1}$ at 0.1 C, an initial Coulombic efficiency of higher than 96.0%, a discharge capacity of greater than 145.0 mAh $g^{-1}$ at 1 C, and a compaction density of 2.50 g $mL^{-1}$, and is very suitable to be used as a positive electrode material for a lithium-ion power battery with high energy and high power density.

DETAILED DESCRIPTION

Figure 1:
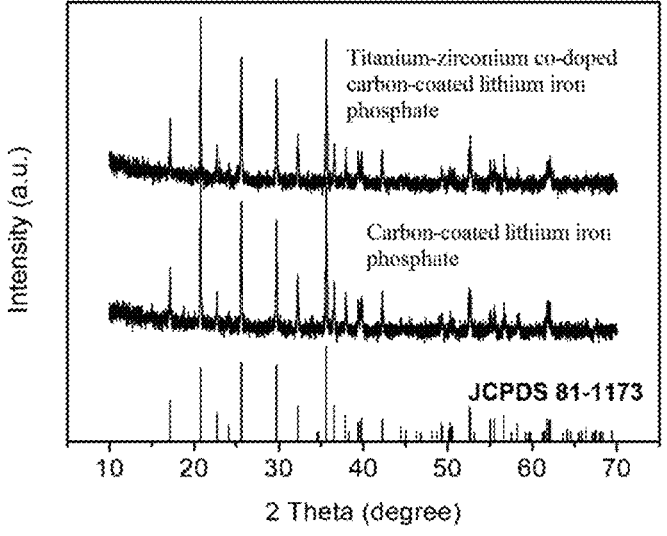
FIG. 1 shows the XRD spectra of the carbon-coated lithium iron phosphate and zirconium-titanium co-doped carbon-coated lithium iron phosphate.

The titanium and zirconium co-doped carbon-coated lithium iron phosphate material of the present disclosure is prepared by doping metal titanium ions and zirconium ions respectively into Fe site and Li site of the $LiFePO_4$ material through a specific process. The material has a specific chemical formula of $Li_{1-y}Zr_yFe_{1-x}Ti_xPO_4/C$, wherein titanium is doped to Fe site, zirconium is doped to Li site, $0.001 \leq x \leq 0.05$, and $0.001 \leq y \leq 0.02$, and the material has a carbon content of 0.5-5.0 wt %.

The method for producing the titanium-zirconium co-doped carbon-coated lithium iron phosphate material comprises mixing iron phosphate, lithium carbonate, a carbon source, a titanium source and a zirconium source in a liquid medium, ball-milling and sand-milling the mixture to a certain slurry particle size, spray-drying the slurry for granulation, then sintering the dried spray material in an atmosphere furnace, and pulverizing the resulting material to finally obtain the titanium-zirconium co-doped carbon-coated lithium iron phosphate material. The method comprises the specific steps of:

(1) weighing iron phosphate, lithium carbonate, a titanium source and a zirconium source according to an element molar ratio of Li:Zr:Fe:Ti:P of 1-y:y: 1-x:x: 1, and mixing them in a liquid medium, where $0.001 \leq x \leq 0.05$, $0.001 \leq y \leq 0.02$;

(2) adding a carbon source to the mixture obtained in step (1), and then ball-milling and sand-milling the mixture to control a slurry particle size at 0.1-0.8 μm;

(3) spray-drying the slurry obtained in step (2) at an atomization frequency of 20-80 Hz, with a heating air at an air inlet temperature of 100-300° C., and an air outlet temperature of 50-200° C., to obtain a yellow powder spray material;

(4) pre-sintering the dried spray material obtained in step (3) in an atmosphere furnace with protective gas at 300-500° C. for 2-5 h, and then sintering it at 500-900° C. for 5-15 h to obtain the titanium-zirconium co-doped carbon-coated lithium iron phosphate material;

(5) pulverizing the product after the sintering process is completed to obtain a black powder product.

In the above step (1): the titanium source is selected from the group consisting of titanium dioxide, titanyl sulfate, titanium tetrachloride, tetrabutyl titanate and a mixture thereof;

the zirconium source is selected from the group consisting of zirconium oxide, zirconium hydroxide, zirconium nitrate, zirconium phosphate and a mixture thereof;

and the liquid medium is selected from the group consisting of deionized water, anhydrous ethanol and a mixture thereof.

In the above step (2): the carbon source is selected from the group consisting of glucose, sucrose, citric acid, polyethylene glycol and a mixture thereof, and the carbon source is added at such an amount that the carbon content in the final product is 0.5-5.0 wt %.

In the above step (4): the protective gas is argon or nitrogen.

Preferably, in step (1), the titanium source is tetrabutyl titanate, the zirconium source is zirconium hydroxide, and the liquid medium is deionized water.

Preferably, in step (2), the carbon source is glucose and polyethylene glycol, the carbon content in the final product is 1.5 wt %, and the particle size of the slurry is 0.4 μm.

Preferably, in step (3), the atomization frequency is 60 Hz, the air inlet temperature of the heating air is 200° C., and the air outlet temperature is 100° C.

Preferably, in step (4), the protective gas is Ar, the pre-sintering is conducted at 350° C. for 3 h; and the sintering is conducted at 800° C. for 10 h.

The present disclosure is further illustrated below according to specific examples:

Example 1

Iron phosphate, lithium carbonate, tetrabutyl titanate and zirconium hydroxide were weighed according to an element molar ratio of Li:Zr:Fe:Ti:P of 0.985:0.015:0.99:0.01:1, and mixed in deionized water. After glucose was added, the obtained mixture was ball-milled and sand-milled to control a slurry particle size at 0.4 nm. The slurry was spray-dried at an atomization frequency of 50 Hz, with a heating air at an air inlet temperature of 200° C., and an air outlet temperature of 100° C. Finally, the dried spray material was pre-sintered at 350° C. for 3 h in an atmosphere furnace filled with argon, and then sintered at 800° C. for 10 h. After the sintering was completed, the resulting material was pulverized to obtain a black powder of titanium-zirconium co-doped carbon-coated lithium iron phosphate material, which had a carbon content of 0.5 wt %, a discharge capacity of 158.3 mAh $g^{-1}$ 0.1 C, an initial Coulombic efficiency of 98.4%, a discharge capacity of 145.5 mAh $g^{-1}$ at 1 C, and a compaction density of 2.52 g $mL^{-1}$.

Example 2

Iron phosphate, lithium carbonate, titanium dioxide and zirconium oxide were weighed according to an element molar ratio of Li:Zr:Fe:Ti:P of 0.98:0.02:0.96:0.04:1, and mixed in deionized water. After sucrose was added, the obtained mixture was ball-milled and sand-milled to control a slurry particle size at 0.2 μm. The slurry was spray-dried at an atomization frequency of 60 Hz, with a heating air at an air inlet temperature of 150° C., and an air outlet temperature of 70° C. Finally, the dried spray material was pre-sintered at 300° C. for 5 h in an atmosphere furnace filled with nitrogen, and then sintered at 750° C. for 12 h. After the sintering was completed, the resulting material was pulverized to obtain a black powder of titanium-zirconium co-doped carbon-coated lithium iron phosphate material, which had a carbon content of 1.1 wt %, a discharge capacity of 159.1 mAh $g^{-1}$ at 0.1 C, an initial Coulombic efficiency of 97.3%, a discharge capacity of 148.0 mAh $g^{-1}$ at 1 C, and a compaction density of 2.38 g $mL^{-1}$.

Example 3

Iron phosphate, lithium carbonate, titanyl sulfate and zirconium nitrate were weighed according to an element molar ratio of Li:Zr:Fe:Ti:P of 0.985:0.015:0.99:0.02:1, and mixed in anhydrous alcohol. After citric acid and polyethylene glycol were added, the obtained mixture was ball-milled and sand-milled to control a slurry particle size at 0.1 nm. The slurry was spray-dried at an atomization frequency of 80 Hz, with a heating air at an air inlet temperature of 100° C., and an air outlet temperature of 50° C. Finally, the dried spray material was pre-sintered at 380° C. for 4 h in an atmosphere furnace filled with argon, and then sintered at 600° C. for 12 h. After the sintering was completed, the resulting material was pulverized to obtain a black powder of titanium-zirconium co-doped carbon-coated lithium iron phosphate material, which had a carbon content of 2.0 wt %, a discharge capacity of 156.5 mAh $g^{-1}$ at 0.1 C, an initial Coulombic efficiency of 95.3%, a discharge capacity of 140.2 mAh $g^{-1}$ at 1 C, and a compaction density of 2.25 g $mL^{-1}$.

Example 4

Iron phosphate, lithium carbonate, titanium tetrachloride and tetrabutyl titanate were weighed according to an element molar ratio of Li:Zr:Fe:Ti:P of 0.995:0.005:0.95:0.05:1, and mixed in deionized water. After glucose was added, the obtained mixture was ball-milled and sand-milled to control a slurry particle size at 0.5 nm. The slurry was spray-dried at an atomization frequency of 50 Hz, with a heating air at an air inlet temperature of 180° C., and an air outlet temperature of 90° C. Finally, the dried spray material was pre-sintered at 320° C. for 4 h in an atmosphere furnace filled with argon, and then sintered at 500° C. for 12 h. After the sintering was completed, the resulting material was pulverized to obtain a black powder of titanium-zirconium co-doped carbon-coated lithium iron phosphate material, which had a carbon content of 3.5 wt %, a discharge capacity of 153.3 mAh $g^{-1}$ 0.1 C, an initial Coulombic efficiency of 94.1%, a discharge capacity of 135.3 mAh $g^{-1}$ at 1 C, and a compaction density of 2.15 g $mL^{-1}$.

Example 5

Iron phosphate, lithium carbonate, titanium tetrachloride and zirconium phosphate were weighed according to an element molar ratio of Li:Zr:Fe:Ti:P of 0.999:0.001:0.98:0.02:1, and mixed in deionized water. After sucrose and citric acid were added, the obtained mixture was ball-milled and sand-milled to control a slurry particle size at 0.6 nm. The slurry was spray-dried at an atomization frequency of 40 Hz, with a heating air at an air inlet temperature of 220° C., and an air outlet temperature of 120° C. Finally, the dried spray material was pre-sintered at 430° C. for 3 h in an atmosphere furnace filled with nitrogen, and then sintered at 800° C. for 9 h. After the sintering was completed, the resulting material was pulverized to obtain a black powder of titanium-zirconium co-doped carbon-coated lithium iron phosphate material, which had a carbon content of 1.5 wt %, a discharge capacity of 159.2 mAh $g^{-1}$ 0.1 C, an initial Coulombic efficiency of 96.5%, a discharge capacity of 139.0 mAh $g^{-1}$ at 1 C, and a compaction density of 2.39 g $mL^{-1}$.

Example 6

Iron phosphate, lithium carbonate, titanium dioxide, titanyl sulfate, titanium tetrachloride, and zirconium hydroxide were weighed according to an element molar ratio of Li:Zr:Fe:Ti:P of 0.98:0.02:0.999:0.001:1, and mixed in deionized water. After glucose and citric acid were added, the obtained mixture was ball-milled and sand-milled to control a slurry particle size at 0.8 nm. The slurry was spray-dried at an atomization frequency of 20 Hz, with a heating air at an air inlet temperature of 300° C., and an air outlet temperature of 200° C. Finally, the dried spray material was pre-sintered at 500° C. for 2 h in an atmosphere furnace filled with argon, and then sintered at 900° C. for 5 h. After the sintering was completed, the resulting material was pulverized to obtain a black powder of titanium-zirconium co-doped carbon-coated lithium iron phosphate material, which had a carbon content of 1.0 wt %, a discharge capacity of 155.5 mAh eat 0.1 C, an initial Coulombic efficiency of 94.4%, a discharge capacity of 136.2 mAh $g^{-1}$ at 1 C, and a compaction density of 2.55 g $mL^{-1}$.

Example 7

Iron phosphate, lithium carbonate, tetrabutyl titanate, zirconium oxide, zirconium hydroxide and zirconium nitrate were weighed according to an element molar ratio of Li:Zr: Fe:Ti:P of 0.99:0.01:0.97:0.03:1, and mixed in anhydrous ethanol. After sucrose, citric acid and polyethylene glycol were added, the obtained mixture was ball-milled and sand-milled to control a slurry particle size at 0.7 nm. The slurry was spray-dried at an atomization frequency of 30 Hz, with a heating air at an air inlet temperature of 280° C., and an air outlet temperature of 150° C. Finally, the dried spray material was pre-sintered at 400° C. for 2 h in an atmosphere furnace filled with nitrogen, and then sintered at 850° C. for 7 h. After the sintering was completed, the resulting material was pulverized to obtain a black powder of titanium-zirconium co-doped carbon-coated lithium iron phosphate material, which had a carbon content of 5.0 wt %, a discharge capacity of 157.0 mAh $g^{-1}$ at 0.1 C, an initial Coulombic efficiency of 96.2%, a discharge capacity of 140.5 mAh $g^{-1}$ at 1 C, and a compaction density of 2.35 g $mL^{-1}$.

Figure 2:
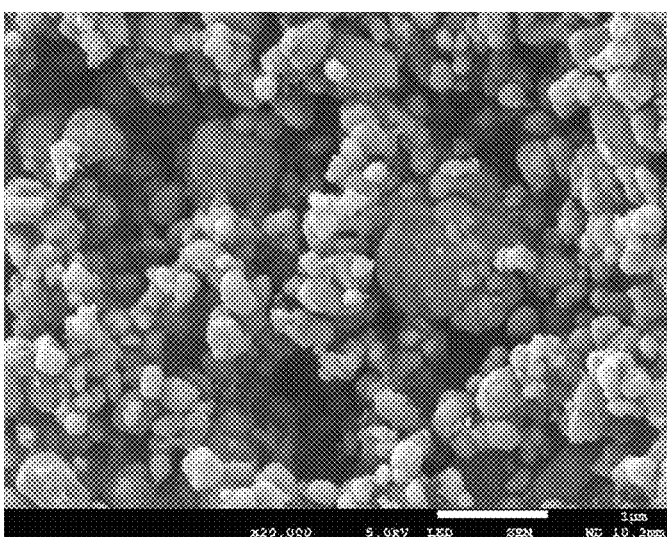
FIG. 2 is the SEM image of the zirconium-titanium co-doped carbon-coated lithium iron phosphate of the present disclosure.
Figure 3:
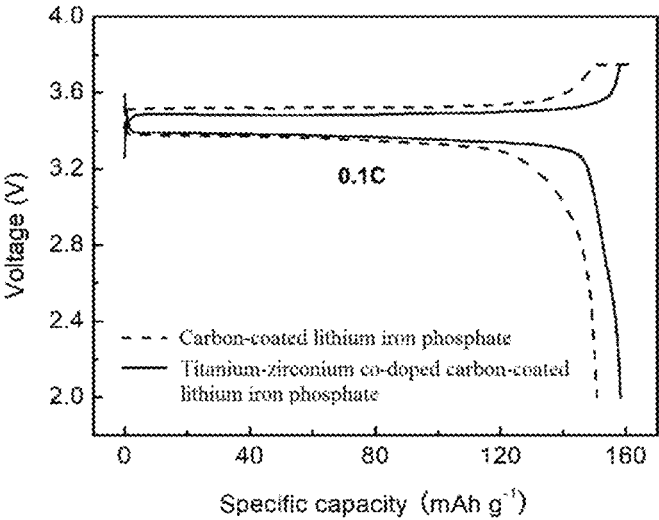
FIG. 3 shows the primary charge and discharge diagrams of the carbon-coated lithium iron phosphate and zirconium-titanium co-doped carbon-coated lithium iron phosphate.

In the present disclosure, undoped carbon-coated lithium iron phosphate material (i.e., no titanium source or zirconium source were added in the production process) was used as a comparative example. Referring to FIG. 1, FIG. 2 and FIG. 3, it is not difficult to find that co-doping of titanium and zirconium can effectively improve the electrochemical performance of carbon-coated lithium iron phosphate, so as to obtain a positive electrode material for a lithium-ion power battery with high energy and high power density.

Due to the doping of titanium ions and zirconium ions to Fe sites and Li sites of the carbon-coated lithium iron phosphate material respectively, the present disclosure can effectively improve the electrochemical performance and compaction density of the lithium iron phosphate material, which is very suitable to be used as a positive electrode material for a lithium-ion power battery with high energy and high power density. It is easy for those skilled in the art to understand that the above descriptions are only preferred embodiments of the present disclosure, and are not intended to limit the present disclosure. Any modifications, equivalent replacements and improvements made within the spirit and principles of the present disclosure should be included within the protection scope of the present disclosure.

The invention claimed is:

1. A titanium-zirconium co-doped carbon-coated lithium iron phosphate material, which has a chemical formula of $Li_{1-y}Zr_yFe_{1-x}Ti_xPO_4/C$, wherein titanium is doped to Fe site, zirconium is doped to Li site, $0.001 \leq x \leq 0.05$, and $0.001 \leq y \leq 0.02$.

2. The titanium-zirconium co-doped carbon-coated lithium iron phosphate material according to claim 1, which has a carbon content of 0.5-5.0 wt %.

3. A method for producing the titanium-zirconium co-doped carbon-coated lithium iron phosphate material according to claim 1, comprising mixing iron phosphate, lithium carbonate, a carbon source, a titanium source and a zirconium source in a liquid medium, ball-milling and sand-milling the mixture to a certain slurry particle size, spray-drying the slurry for granulation, then sintering the dried spray material in an atmosphere furnace, and pulverizing the resulting material to finally obtain the titanium-zirconium co-doped carbon-coated lithium iron phosphate material.

4. The method for producing the titanium-zirconium co-doped carbon-coated lithium iron phosphate material according to claim 3, comprising the steps of:
   (1) weighing iron phosphate, lithium carbonate, a titanium source and a zirconium source according to an element molar ratio of Li:Zr:Fe:Ti:P of 1-y:y:1-x:x:1, and mixing them in a liquid medium, where $0.001 \leq x \leq 0.05$, $0.001 \leq y \leq 0.02$;
   (2) adding a carbon source to the mixture obtained in step (1), and then ball-milling and sand-milling the mixture to control a slurry particle size at 0.1-0.8 μm;
   (3) spray-drying the slurry obtained in step (2) at an atomization frequency of 20-80 Hz, with a heating air at an air inlet temperature of 100-300° C., and an air outlet temperature of 50-200° C.;
   (4) pre-sintering the dried spray material obtained in step (3) in an atmosphere furnace with protective gas at 300-500° C. for 2-5 h, and then sintering it at 500-900° C. for 5-15 h to obtain the titanium-zirconium co-doped carbon-coated lithium iron phosphate material.

5. The method for producing the titanium-zirconium co-doped carbon-coated lithium iron phosphate material according to claim 4, wherein the titanium source is selected from the group consisting of titanium dioxide, titanyl sulfate, titanium tetrachloride, tetrabutyl titanate and a mixture thereof.

6. The method for producing the titanium-zirconium co-doped carbon-coated lithium iron phosphate material according to claim 4, wherein the zirconium source is selected from the group consisting of zirconium oxide, zirconium hydroxide, zirconium nitrate, zirconium phosphate and a mixture thereof.

7. The method for producing the titanium-zirconium co-doped carbon-coated lithium iron phosphate material according to claim 4, wherein the liquid medium is selected from the group consisting of deionized water, anhydrous ethanol and a mixture thereof.

8. The method for producing the titanium-zirconium co-doped carbon-coated lithium iron phosphate material according to claim 4, wherein the carbon source is selected from the group consisting of glucose, sucrose, citric acid, polyethylene glycol and a mixture thereof, and the carbon source is added at such an amount that the carbon content in the final product is 0.5-5.0 wt %.

9. The method for producing the titanium-zirconium co-doped carbon-coated lithium iron phosphate material according to claim 4, wherein the spay-drying is conducted at an atomization frequency of 60 Hz, an air inlet temperature of 200° C., and an air outlet temperature of 100° C.; the pre-sintering is conducted at 400° C. for 3 h; and the sintering is conducted at 800° C. for 10 h.

10. A method for preparing a lithium-ion battery, comprising using the titanium-zirconium co-doped carbon-coated lithium iron phosphate material according to claim 1 as a positive electrode material.

* * * * *